of Office 2,963,345
Patented Dec. 6, 1960

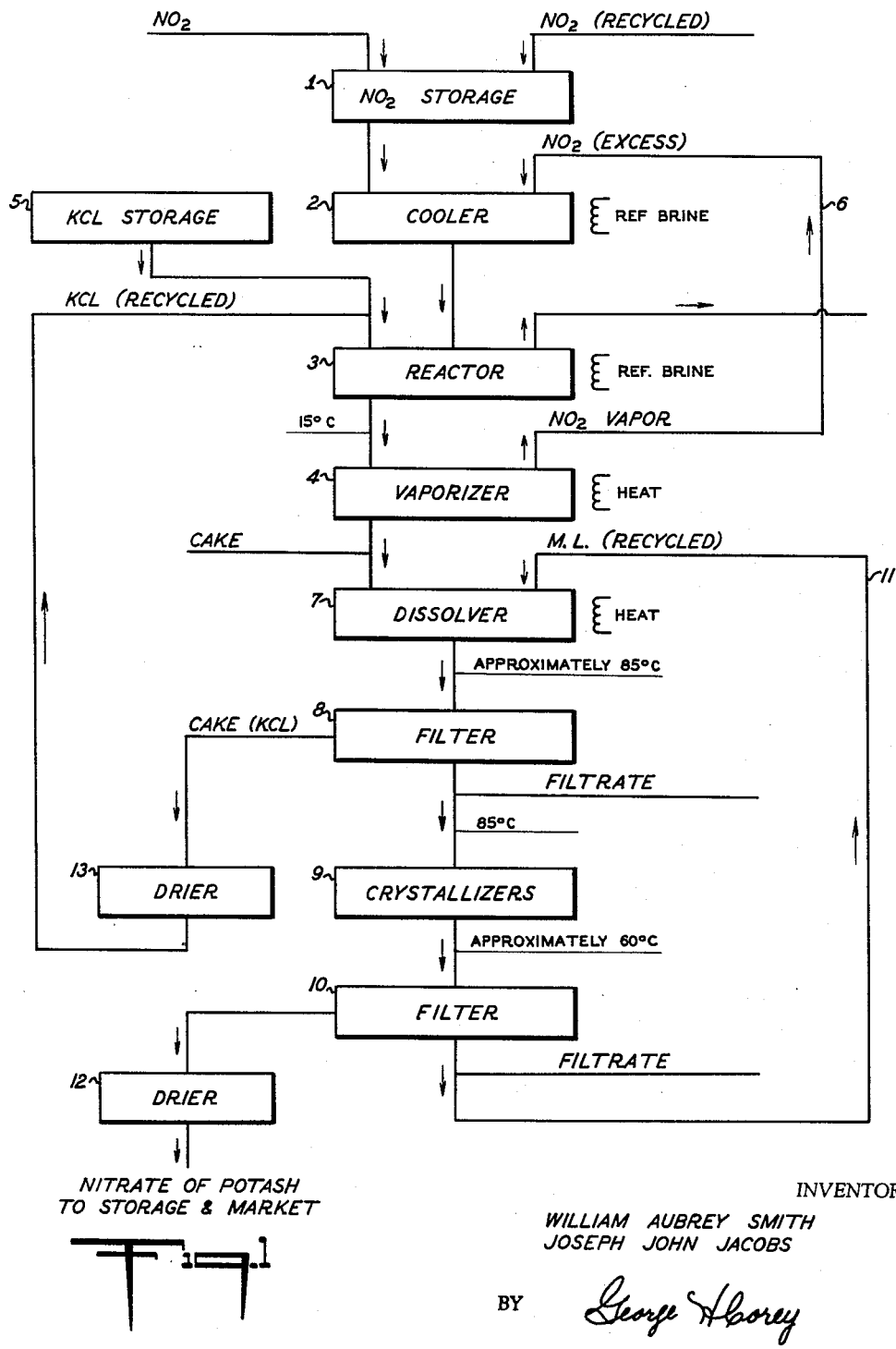

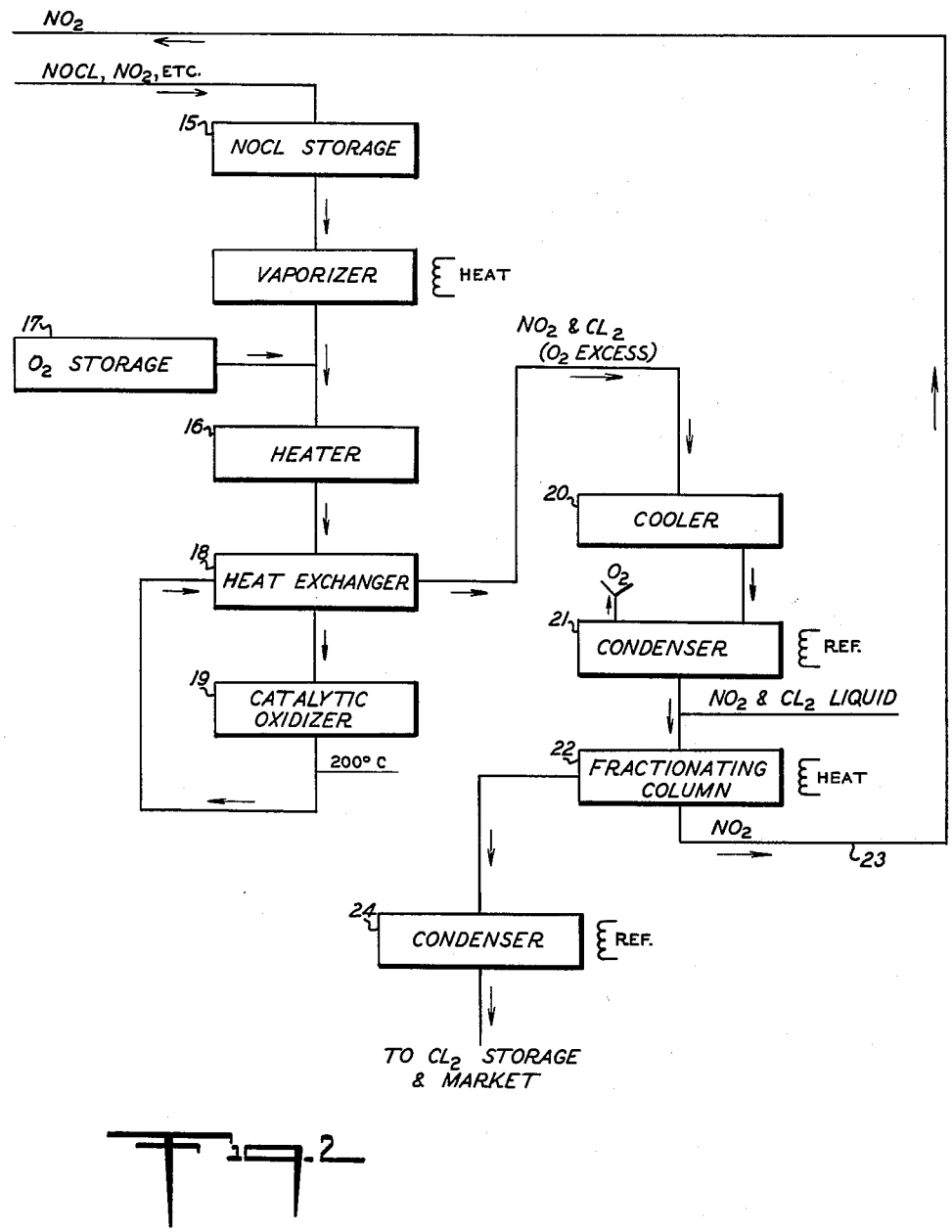

2,963,345

PRODUCTION OF CHLORINE AND ALKALI METAL NITRATES FROM ALKALI METAL CHLORIDES

William Aubrey Smith, Carlsbad, N. Mex., and Joseph John Jacobs, Altadena, Calif., assignors to American Metal Climax, Inc., a corporation of New York Filed July 11, 1956, Ser. No. 597,263

4 Claims. (Cl. 23—102)

This invention is concerned with the production of chlorine and alkali metal nitrates from nitrogen peroxide and the corresponding chlorides.

It is well known that an alkali metal chloride may be reacted with nitrogen oxides, especially nitrogen peroxide, or with nitric acid to form the corresponding nitrate. Under suitable conditions nitrosyl chloride and more or less chlorine are formed in addition to the nitrate.

Various processes have been proposed for bringing about the basic reactions of the nitrogen oxides with the chlorides and for producing chlorine as a valuable by-product, but all the processes proposed up to this time have presented various serious difficulties.

For example, those processes wherein the reaction is carried out with the use of nitric acid or in aqueous solutions give rise to serious corrosion problems, and in addition involve the use of complex separation procedures to recover the chlorine value. It has also been proposed to minimize the corrosion difficulties by passing nitrogen peroxide gas over an alkali metal chloride with the latter in the solid state (U.S. Patent No. 1,965,-400 issued to Whittaker and Lundstrom on July 3, 1934). However, the results obtained when the process was carried out under anhydrous conditions were not promising, only 1.7% of potassium nitrate being formed after passing the nitrogen peroxide vapors through potassium chloride crystals over a period of 24 hours. When the potassium chloride crystals were moistened the reaction proceeded more rapidly, but nevertheless relatively slowly unless sufficient moisture were present to give rise to objectionable corrosion of equipment of the types that would ordinarily be used in a commercial operation.

It has also been proposed to react the finely ground potassium chloride with liquid nitrogen peroxide in the presence of a few percents of moisture, but so far as we are informed this process has never been adopted on a commercial basis. This may be partly or wholly explained as due to the fact that the procedures disclosed require use of extremely finely ground potassium chloride as a starting material and the further fact that the resulting nitrate product was unsuited for commercial use without further more or less expensive treatments to convert it to a commercially acceptable form.

It is an object of the present invention to react alkali metal chlorides with nitrogen peroxide under substantially anhydrous conditions and at rates that give to the process a practical commercial importance and this without giving rise to objectionable corrosion conditions when using readily available types of metallic construction materials.

It is a further object of the invention to recover the nitrogen content of the effluent gases in the form of nitrogen peroxide which is returned to the reaction and also to recover chlorine in a form in which it may be used as such for various industrial purposes.

It is a still further object of the invention to effect a separation of the alkali metal nitrate from residual unreacted metal chloride in a relatively simple manner and with a minimum of washing and recrystallization steps to produce a commercially acceptable nitrate product.

Other objects and advantages of the invention will become apparent from the hereinafter detailed description.

In its broader aspects the invention consists in bringing the alkali metal chloride in the solid state and of a suitable degree of fineness into contact with liquid nitrogen peroxide and mixing the reactants under anhydrous or at least substantially anhydrous conditions while controlling the temperature and pressure in the reaction zone so as to insure that the solid chloride particles are kept in substantially continuous contact with the nitrogen peroxide in the liquid state and at the same time the temperature and pressure conditions are further so regulated as to insure that the nitrosyl chloride formed in the reaction is kept from building up in the reaction zone to a point where it unduly interferes with or retards the reaction of the nitrogen peroxide with the alkali metal chloride.

After the reaction has proceeded to the point where the finer alkali metal chloride particles have been completely converted, or, in the case of larger particles, the reaction has slowed down due to the formation of blocking layers of the nitrate on the surfaces of the particles, the temperature of the reaction mixture is raised sufficiently to vaporize the unreacted nitrogen peroxide. The vaporization step may be conducted in the same vessel or reaction chamber, for example, when a batch operation is used, or after transfer of the reaction mixture to a separate vessel.

If nitrosyl chloride and any lower nitrogen oxide compounds are intermittently or continuously flashed off to a sufficient degree in the course of the reaction as preferred and described in more detail hereinafter, the effluent produced in the vaporization stage may be directly recycled to a condenser and reintroduced into the reaction zone along with or separately from further additions of liquid nitrogen peroxide from storage.

After the vaporization step, the mixture of solid alkali metal nitrate and whatever residual alkali metal chloride is associated therewith is then mixed with a brine containing suitable proportions of the nitrate and the chloride involved in the process. This brine may, for example, be a mother liquor consisting essentially of the filtrate resulting from a subsequent step of recrystallization of the nitrate formed in the process. Sufficient heat is provided and, if desired, a certain amount of water may be added, to bring about the solution of the nitrate crystals. By suitable regulation of the temperature the nitrate may be substantially completely dissolved away from the residual alkali metal chloride without dissolving the latter. When solution of the nitrate is sufficiently complete the resulting mixture of nitrate liquor and residual solid alkali metal chloride is filtered. The filter cake of the chloride is dried and then recycled to the initial reaction stage. The filtrate consisting of a highly saturated solution of the nitrate is then passed to a crystallizer for recovery of nitrate in a suitable crystalline form. After filtering the potassium nitrate filter cake is dried and sent to storage. The filtrate or mother liquor is recycled to the dissolving step previously described.

The nitrogen peroxide-alkali metal chloride reaction previously described is preferably carried on under such conditions of temperature and pressure regulation as to insure a certain degree of vaporization of the nitrogen peroxide so that nitrosyl chloride and any other readily vaporizable nitrogen-containing compounds formed in the course of the process are removed either intermittently or more or less continuously so as not to build up in the system to such a degree as to interfere unduly with the primary reaction. For example, the temperature may be raised moderately at intervals to flash off accumulated nitrosyl chloride. Alternatively, the temperature and pressure in the reaction zone may be so regulated as to insure a more or less continuous withdrawal of nitrosyl chloride along with a portion of the nitrogen peroxide as vapors.

The gaseous effluent from the reaction zone, consisting as above stated of nitrosyl chloride, more or less nitrogen peroxide and perhaps some other nitrogen oxides, is reacted, either directly or after condensation or collection in storage, with oxygen provided in excess and under suitable heating conditions to reform nitrogen peroxide and liberate chlorine. A suitable catalyst is usually also provided to facilitate the reaction. The resulting mixture is then passed through coolers and eventually to a condenser in which the nitrogen peroxide and chlorine are recovered in the liquid state. During the cooling and condensation steps the excess oxygen is vented to the atmosphere or returned to the oxygenating stage of this part of the complete process. The liquid mixture of nitrogen peroxide and chlorine is then passed through a fractionating column and separated, the chlorine being taken off as vapors at an intermediate stage and condensed and the nitrogen peroxide is recovered as a liquid and recycled and used in the nitrogen peroxide-alkali metal chloride reaction.

It will be apparent from the above general description and reference to the accompanying flow sheets that in all three of the primary subdivisions of the complete process very marked simplification is obtained as compared with the prior art processes, and since the reaction between the alkali metal chloride and nitrogen peroxide is carried out under anhydrous or substantially anhydrous conditions the problem of corrosion is practically eliminated. It will also be understood that many expensive pieces of equipment customarily used in the one prior process presently in use in this country for the production of chlorine and alkali metal nitrates from alkali metal chlorides is avoided.

The presently preferred form of the process as applied in the conversion of potassium chloride to potassium nitrate with production of chlorine is illustrated in the flow sheet set out in Figs. 1 and 2 of the accompanying drawing.

Reference will first be made to Fig. 1, wherein the stages of the process involving the basic reaction of nitrogen peroxide and potassium chloride and the recovery of the resulting potassium nitrate product are shown. These subdivisions of the process will hereinafter sometimes be spoken of as "the nitrogen peroxide-alkali metal chloride reaction step" and "the alkali metal separation and recovery step."

*The nitrogen peroxide-alkali metal chloride reaction step*

Referring to Fig. 1 there are shown diagrammatically a vessel 1 for nitrogen peroxide storage, a cooler 2, a reactor 3, a vaporizer 4 and a storage vessel 5 or other suitable source of supply of the alkali metal chloride.

Liquid nitrogen peroxide from the cooler 2 and the alkali metal chloride from 5 are introduced into the reactor which is provided with suitable refrigeration to maintain the temperature therein such that at least the bulk of the nitrogen peroxide will remain in the liquid state, for example, at about 15° C. under atmospheric pressure. Sufficient nitrogen peroxide is introduced to insure that the mixture with the alkali metal chloride forms a free flowing and easily stirred slurry. The reactor 3 may take various forms but should include suitable means for agitating and mixing the reactants. In fact, it is preferable and one of the features of the invention that the mixing be so conducted as to bring about more or less attrition of the surfaces of the solid particles to the end that nitrate formed on the surfaces of the alkali metal chloride particles will be removed, thus exposing fresh surfaces of the alkali metal chloride for reaction with the surrounding liquid nitrogen peroxide.

When the reaction has proceeded to a suitable extent the resulting mixture is transferred to the vaporizer 4 wherein it is heated sufficiently to drive off as vapors the excess nitrogen peroxide together with any dissolved nitrosyl chloride or other nitrogen oxides associated therewith. Usually, however, the nitrosyl chloride as well as any lower nitrogen oxides and free chlorine formed in the reaction zone will have been removed from the reaction mixture while the mixture is still in the reactor and before it is transferred to the vaporizer, this being accomplished by either continuously or intermittently flashing off a portion of the nitrogen peroxide as vapors; that is to say, by allowing the temperature in the reactor to rise sufficiently to bring about a substantial vaporization of the nitrogen peroxide.

The periodic or continuous flashing off of a portion of the nitrogen peroxide as vapors is a desirable feature of the invention since by so doing undue buildup of nitrosyl chloride in the reaction mixture is prevented. Contrary to what might be supposed from the boiling points of nitrogen peroxide and nitrosyl chloride and from the other available data concerning the properties of nitrosyl chloride, it appears that it is very soluble in liquid nitrogen peroxide and as formed in the reaction will accumulate and tend to lower the rate of reaction of the peroxide with the alkali metal chloride. However, we have found that by suitably regulating the temperature in the reaction zone it is practicable to cause either an intermittent or a more or less continuous vaporization of the nitrogen peroxide sufficient to carry off therewith nitrosyl chloride vapors to such extent that they do not build up to an objectionable degree in the reactor. For example, when operating with the temperature kept around 15° C. in the reaction zone and at substantially atmospheric pressure there will be a continual evolution of vapors of nitrogen peroxide, due to the considerable vapor pressure of the peroxide at that temperature, and these vapors entrain and carry along with them sufficient of the nitrosyl chloride formed in the course of the reaction to keep the proportion dissolved in the reaction mixture within acceptable limits.

Instead of conducting the vaporization of the excess nitrogen peroxide in a separate vaporizer unit, the vaporizing step may be carried on in the reactor provided the reactor is equipped with suitable means for heating the reaction mixture therein during the vaporizing step. However, it will usually be preferable to provide separate vessels in which to conduct the reaction and the vaporization steps. The separate arrangement also makes possible the carrying on of the reaction of the alkali metal chloride with the nitrogen peroxide on a continuous or semi-continuous basis.

As previously indicated, sufficient nitrogen peroxide should be provided in the reaction zone relative to the proportions of solid alkali metal chloride and the solid alkali metal nitrate formed during the reaction so as to maintain the mixture in the form of a freely handleable slurry. This requires that nitrogen peroxide be present in considerable excess of the stoichiometric proportions of the alkali metal chloride and nitrogen peroxide. Our investigations indicate that it is preferable to provide nitrogen peroxide in a proportion at least 2½ to 3 times the stoichiometric proportion for the reaction with the amount of alkali metal chloride present in the reaction zone. When preparing potassium nitrate by reacting potassium chloride with nitrogen peroxide in the liquid phase according to the present process and with the temperature maintained in the reaction zone at a point close to but below the boiling point of nitrogen peroxide, and at substantially atmospheric pressure, the reaction proceeds more rapidly when nitrogen peroxide is present in the reaction zone in a proportion of at least 6 mols to each mol of potassium chloride.

The extent and rate of conversion of the alkali metal chloride to the corresponding nitrate depends to a considerable extent on the fineness of the chloride. The finer the particles the greater the surface areas provided for contact with the nitrogen peroxide and consequently the reaction will proceed more rapidly and further toward completion in a given length of time. Since the alkali metal nitrate reaction product is solid at the temperature employed, a layer of the nitrate will form on the surfaces of the chloride particles and unless removed the reaction will eventually cease if the chloride particles are above a given minimal size. This will vary somewhat with various operating conditions such as the degree of attrition brought about during the mixing of the reactants. However, we have found that it is entirely practical to start with a commercial grade of muriate of potash of minus 65 mesh and with suitable agitation of the reaction mixture, bringing about more or less attrition of the solid particle surfaces exposed in the reaction zone, to effect conversion of as much as 40% of the chloride to nitrate before the reaction rate has slowed to the point where further mixing is uneconomical.

The extent of the reaction may be increased by withdrawing the solids, regrinding and returning to the zone or by increasing the degree of attrition grinding in the reaction zone. As will be described in greater detail, hereinafter we prefer to withdraw the reaction mixture from the reaction zone at the stage where the reaction is beginning to slow down due to the buildup of soild alkali metal nitrate on the chloride particles, then separate the residual solid chloride from the nitrate and thereafter return the chloride particles to the reaction zone.

By starting with finer chloride material the reaction may be carried further to completion in a single stage of reaction. For example, when producing $KNO_3$ from KCl, if the KCl raw material is all minus 200 mesh a conversion of up to about 60% of the KCl may be obtained in a single stage of reaction without resorting to grinding or pronounced attrition except that brought about by ordinary mixing.

By grinding during the course of the reaction it is possible to bring the reaction practically to completion within a reasonable length of time, and when this is done the resutling product may be used for many commercial purposes without resort to any further purification. In other words, while the alkali metal nitrate separation and recovery step is desirable when a high purity nitrate product is to be obtained, this step may be omitted when the product is destined for certain commercial uses, such, for example, as when it is to be used as a fertilizer.

Although the alkali metal chloride starting material may be dried before it is introduced into the reactor it need not be bone dry. A small amount of tramp moisture may be tolerated and our investigations indicate that even up to about 3% may be present without giving rise to objectionable corrosion. However, it is important to keep the amount of moisture present very low both to avoid corrosion difficulties and also so as not to interfere with the later stages of the process.

As shown in Fig. 1 the nitrogen peroxide vapors driven off from the vaporizer 4 are recycled as indicated by the line 6 to the cooler 2 where they are condensed and then returned to the reactor.

*The alkali metal nitrate separation and recovery step*

When the nitrogen peroxide vapors have all been driven off from the solid mixture of alkali metal nitrate and unreacted metal chloride, this mixture of solids is introduced into a dissolving tank 7 where it is mixed with a mother liquor of the alkali metal nitrate which is recycled from a later crystallizing step hereinafter further described. By suitably controlling the temperature and proportion of water added to the mother liquor in the dissolving tank, it is possible to effect a substantially complete separation of the alkali metal nitrate from the corresponding alkali metal chloride which will remain substantially undissolved while the nitrate is brought into solution.

When applying the process in the production of $KNO_3$ from KCl a satisfactory solution of the $KNO_3$ without dissolving the KCl has been obtained by heating to approximately 85° C. a mixture of the solids received from the vaporizer 4 and a brine having $KNO_3$ and KCl dissolved therein in approximately the proportions these salts bear to one another in the mother liquor remaining after the crystallizing step hereinafter described. The resulting mixture of dissolved $KNO_3$ and residual solid particles of KCl is then passed to the filter 8. The filtrate is led to a suitable crystallizing apparatus 9 and cooled to about 60° C. The mixture of mother liquor and $KNO_3$ crystals is passed to the filter 10. The filtrate or mother liquor is recycled as indicated by the line 11 to the dissolving tank and the filter cake ($KNO_3$ crystals) is passed to the drier 12 where it is dried and then passed to storage.

The filter cake (residual solid KCl) from the filter 8 is likewise passed to a drier 13 where it is dried and then recycled either directly to the reactor 3 or to the storage for KCl. It will be understood that the separation of the $KNO_3$ and KCl in the dissolving and filtering steps conducted at 7 and 8 need not be 100% because any small portion of the $KNO_3$ carried over in the solid filter cake of KCl will be returned to the process and ultimately recovered in solid crystalline form as $KNO_3$.

*The chlorine recovery step*

As shown more particularly in Fig. 2, the vapors either periodically or more or less continuously flashed off from the reactor 3, and which consist primarily of nitrosyl chloride, nitrogen peroxide and lower oxides of nitrogen, are passed to a suitable gasometer or other storage vessel 15 and may be condensed. In order to recover the nitrogen values in useful form as nitrogen peroxide for re-use in the process and the chlorine as elemental chlorine, the mixture of gases is passed to a heater 16 where it is heated in admixture with oxygen from a suitable source of supply as at 17. As shown, the gaseous mixture is first passed through a heater 16 and then through a heat exchanger 18 where further heat is imparted by the products from a catalytic oxidation conducted in the oxidizer 19. Since the oxidation reaction is exothermic, the gases leaving this oxidizer are relatively highly heated, say to 200° C., as they leave the oxidizer. After passing through the heat exchanger 18 the resulting mixture of nitrogen peroxide, elemental chlorine and excess oxygen is passed to a cooler 20 and thence to the condenser 21 where suitable refrigeration is applied to reduce the temperature of the mixture to a point where the nitrogen peroxide and chlorine are condensed in liquid form while the excess oxygen is vented to the atmosphere or otherwise disposed of.

The liquid mixture of nitrogen peroxide and chlorine is then passed to the fractionating column 22 and fractionated under controlled heat and pressure, the chlorine being carried off as an overhead fraction and the nitrogen peroxide being taken off at a lower stage in the fractionating column and recycled to the nitrogen peroxide storage 1 as indicated by the line 23. The chlorine is passed to the condenser 24 where it is subjected to refrigeration and condensed.

It will be understood that the operating conditions specifically disclosed herein, especially with respect to the temperatures maintained at various stages of the process, are set forth by way of example, and that various modifications of the temperature and pressure conditions as well as various of the other operating conditions may be made without departing from the invention which is not to be deemed as limited otherwise than as indicated in the appended claims.

Throughout the specification and the appended claims the expression "nitrogen peroxide" is intended to refer to $NO_2$, $N_2O_4$ or mixtures of $NO_2$ and $N_2O_4$.

We claim:

1. In the preparation of an alkali metal nitrate by reaction of the corresponding chloride with nitrogen peroxide, the improvement which comprises agitating the alkali metal chloride in solid particulate form with nitrogen peroxide in the form of a substantially anhydrous liquid and maintaining continuously the temperature at about 15° C. and the pressure at about atmospheric so as to produce a controlled vaporization of the nitrogen oxides present, withdrawing said vapors together with nitrosyl chloride vapors formed in the reaction and associated with said nitrogen oxide vapors and thereby preventing undue accumulation of nitrosyl chloride therein.

2. A process as claimed in claim 1 wherein the alkali metal reaction product and any unreacted alkali metal chloride are withdrawn from the reaction zone, the alkali metal nitrate is separated from the unreacted alkali metal chloride by dissolving same in a brine that is substantially saturated in respect of the alkali metal chloride content thereof, a brine containing said alkali metal nitrate is separated from the residual alkali metal chloride and the latter is returned to the reaction zone.

3. A process as claimed in claim 1 wherein the nitrosyl chloride withdrawn from the reaction zone is oxidized with liberation of chlorine and reformation of nitrogen peroxide, the chlorine is separated and the nitrogen peroxide is recovered and recycled to the reaction zone.

4. A process as claimed in claim 1 wherein the alkali metal chloride is potassium chloride and potassium nitrate is the resulting nitrate product.

References Cited in the file of this patent

UNITED STATES PATENTS

| | | |
|---|---|---|
| 1,604,660 | Ross et al. | Oct. 26, 1926 |
| 1,875,014 | Kaselitz | Aug. 30, 1932 |
| 1,932,939 | Rosenstein | Oct. 31, 1933 |
| 1,965,400 | Whittaker et al. | July 3, 1934 |
| 2,035,804 | Haase et al. | Mar. 31, 1936 |
| 2,057,957 | Kaselitz | Oct. 20, 1936 |
| 2,064,978 | Kaselitz | Dec. 22, 1936 |
| 2,535,990 | Stengel | Dec. 26, 1950 |
| 2,615,798 | Pitzer | Oct. 28, 1952 |
| 2,683,655 | Peppard et al. | July 13, 1954 |

FOREIGN PATENTS

| | | |
|---|---|---|
| 310,230 | Great Britain | Apr. 25, 1929 |

OTHER REFERENCES

Whittaker et al.: "Preparation of Potassium Nitrate . . . Nitrogen Peroxide," Ind. and Eng. Chem., vol. 23, pages 410–412, December 1931.